UNITED STATES PATENT OFFICE.

RALPH B. HARTSOUGH, OF MINNEAPOLIS, MINNESOTA.

TRACTOR.

1,267,122.     Specification of Letters Patent.     Patented May 21, 1918.

Original application filed June 21, 1915, Serial No. 35,191. Divided and this application filed May 10, 1917. Serial No. 167,703.

*To all whom it may concern:*

Be it known that I, RALPH B. HARTSOUGH, citizen of the United States, resident of Minneapolis, county of Hennepin, and State of Minnesota, have invented certain new and useful Improvements in Tractors, of which the following is a specification.

My invention has for its object to provide an extremely simple and highly efficient tractor, and to such ends, generally stated, the invention consists of the novel devices and combinations of devices hereinafter described and defined in the claims.

More particularly, the present invention is directed to the improvement of small size tractors such as will serve to draw from two to four plows and which are also serviceable as a substitute for horses for drawing wagons, threshing rigs, cultivators, and which are, therefore, well adapted for general farm use.

The present application is a division of my pending application filed June 21, 1915, Serial No. 35,191.

This improved tractor has three wheels, to-wit, two relatively large and heavy rear traction wheels, and a relatively small front guide wheel that is located directly in front of the furrow side traction wheel and it is therefore adapted to run in the same furrow therewith. The motor and driving gears are so mounted that they are nearly counterpoised on the journals of the rear or traction wheels, whereby all but a relatively small part of the load is carried on the two rear traction wheels, and hence, is rendered effective to produce traction on the said two traction wheels. The engine is preferably an explosive engine of the horizontally opposed cylinder type and this engine is connected to the two traction wheels through a differential gear, so that driving power is applied to both traction wheels and side draft or back drag on the tractor, such as produced by an offset idle wheel, is eliminated. At the same time, the front guide wheel being located in front of the furrow side traction wheel is arranged to run in a furrow so that it may be used to automatically guide the tractor. Hence it will be understood that this relative arrangement of the positively driven relatively large traction wheels carrying the main weight of the tractor, and the relatively small front guide wheel arranged to run in a furrow, are salient features of the present invention and are essential to the desired result obtained. Hence it may be further stated that a front guide wheel anywhere near approximating in diameter the diameter of the rear traction wheels, could not possibly be used to guide the tractor in a furrow of the depth made by a plow, because if of such large diameter, it would climb over the wall of the furrow when set to crowd against the same.

The invention also involves other important features which will appear with the following detailed description of the preferred construction of the tractor.

In the accompanying drawings which illustrate the improved tractor in its preferred form, like characters indicate like parts throughout the several views. Referring to the drawings.

Figure 1:
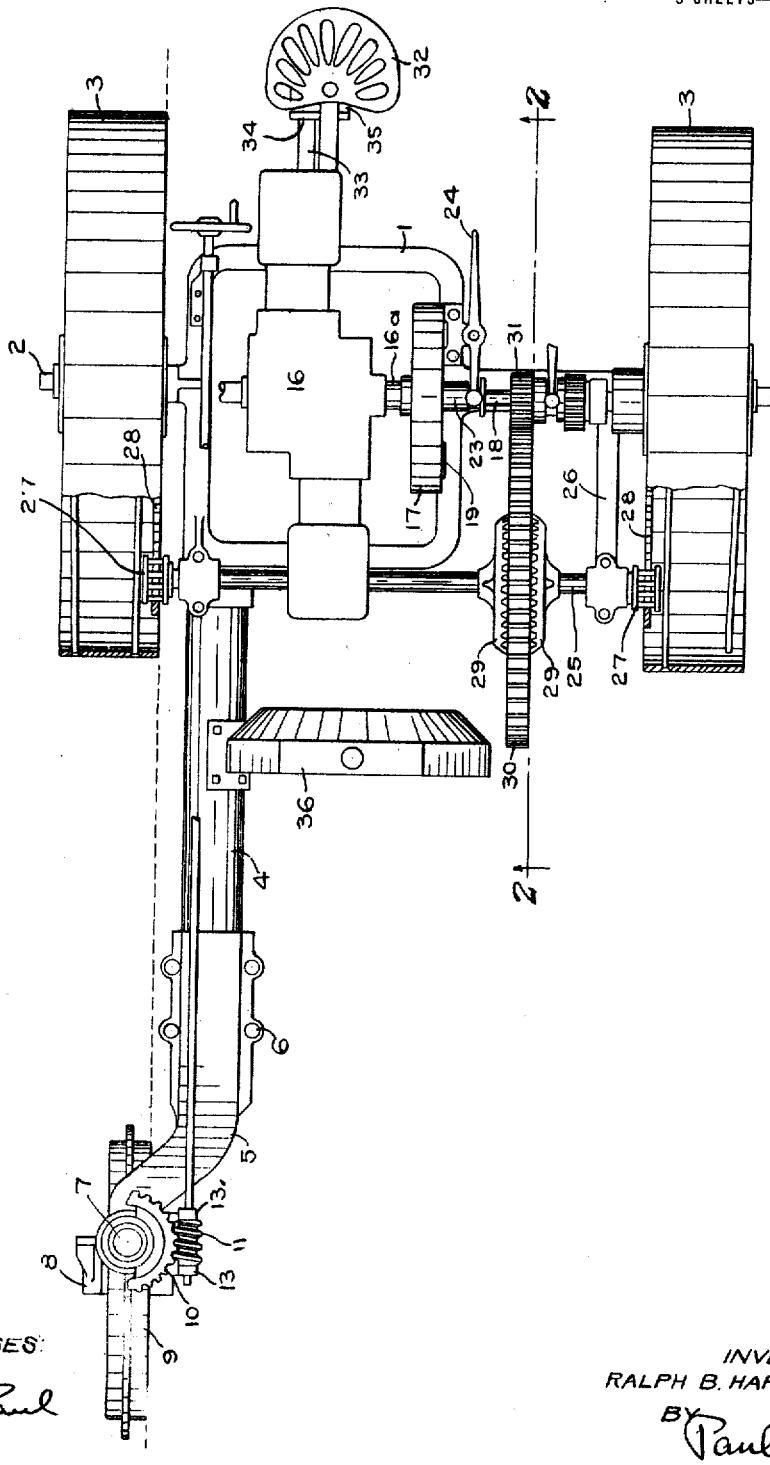
Figure 1 is a plan view of the improved tractor.
Figure 2:
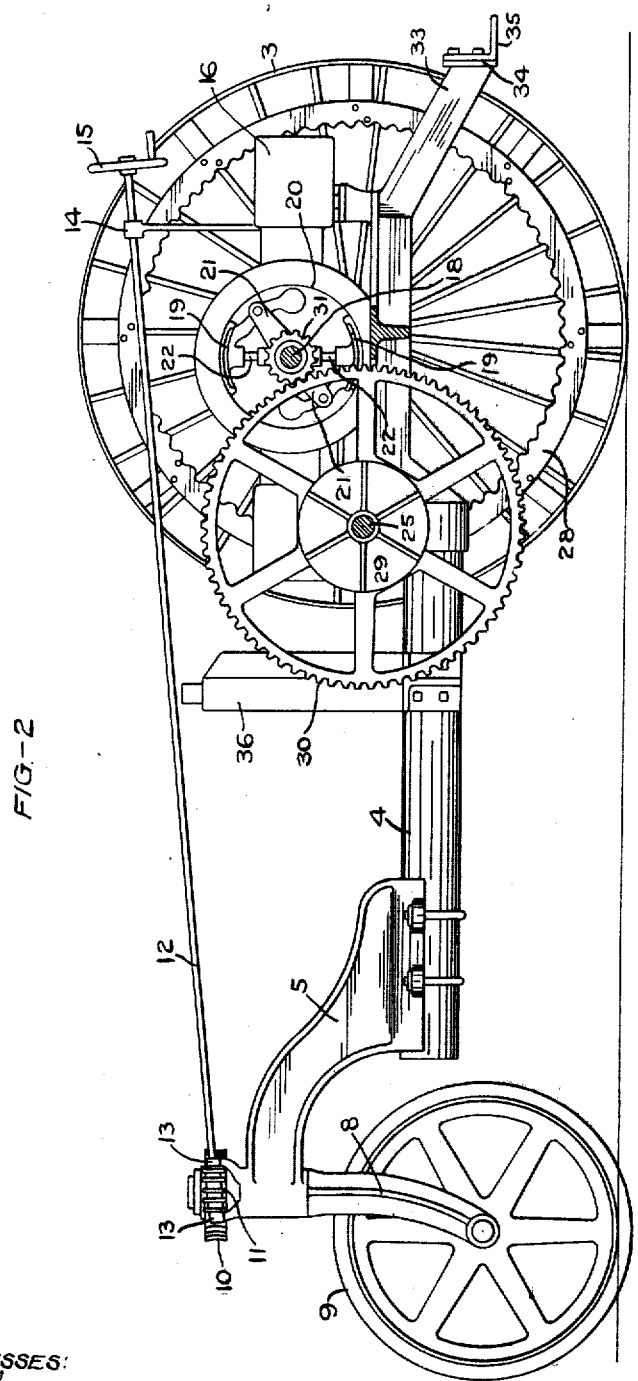
Fig. 2 is a left side elevation of the tractor with some of the parts sectioned on the line 2—2 of Fig. 1.

The frame of the tractor may, of course, take different forms, but as shown, it comprises a rear frame casting 1 having axially alined trunnions 2 on which the large rear traction wheels 3 are journaled. This frame casting 1, at the farther side thereof, is provided with a forwardly projecting arm 4 shown as of cylindrical form. To the front end of this arm 4, a front wheel bearing bracket 5 is rigidly secured, with freedom, however, for forward and rearward adjustments, by means of nut-equipped U-bolts 6. To the front end of this bearing bracket 5, the stem 7 of a pronged upright wheel bracket 8, is journaled, and the relatively small front guide wheel 9 is journaled to the prongs of this wheel bracket. To the upper end of the stem 7 of the said wheel bracket, a segmental worm gear 10 is rigidly secured, and this worm gear is engaged by a worm 11 secured to the front end of a worm operating shaft 12. The front end of this worm shaft 12 is journaled in bearing lugs 13 rigidly secured to the front end of the bracket 5 and bracing the ends of the hub of the worm 11 so that the said worm thrusts against the same. The rear end portion of the said worm operating shaft 12 is journaled in the upper end of a bearing post or bracket 14 rigidly secured on the rear portion of the frame casting 1. At its extreme rear end the said shaft 12 is provided with an operating crank or hand piece 15. Here it will be noted that the shaft 12 is free to slide endwise through the bearing post 14, when the casting 5 is adjusted longitudinally on the arm 4 of the tractor frame. Adjustments of the said casting 5 on the frame 4 will carry the front wheel farther from or nearer to the traction wheels and thereby vary to a considerable extent the balance of the machine and also the steering action.

The explosive engine above referred to is indicated as an entirety by the numeral 16 and the cylinders thereof are rigidly secured to the frame casting 1 with the two cylinders arranged with their axes projecting into forwardly and rearwardly direction and with the engine approximately counterbalanced on the journals of the rear traction wheels. The projecting end of the crank shaft 16ª of this engine carries a fly wheel 17, the hub of which is adapted to be connected, at will, to the adjacent end of an axially alined shaft 18, by means of a friction clutch of suitable construction. Said shaft 18 is journaled in suitable bearings on the frame casting 1. As shown, the friction clutch just noted comprises clutch shoes 19 that engage an internal cylindrical surface 20 of the fly-wheel 17. These clutch shoes 19 are pivoted to the projecting ends of diametrically projected arms 21 rigidly secured to a shaft 18 so that when the said shoes are engaged with the said cylindrical surface 20, the shaft 18 will be coupled for rotation with the engine crank shaft. The shoes 19 have inwardly projecting portions 22 that are engaged by the tapered end of a clutch actuating sleeve 23 mounted to slide in the shaft 18 and subject to an operating lever 24 pivoted to the adjacent portions of the frame casting 1.

The numeral 25 indicates a divided countershaft, one section of which is journaled in suitable bearings on the frame casting 1 and the other end of which is journaled in a suitable bearing on a forwardly projecting arm 26 of the said frame casting. The two shaft sections 25, at their outer ends, are provided with suitable pinions 27 that engage with larger internal gears 28 rigidly secured in any suitable manner with the respective traction wheels 3. The adjacent ends of the sections of the divided countershaft 25 are connected through an ordinary differential gear, the construction of which is well understood, and of the parts of which it is only desirable to particularly note the opposing beveled gears 29 secured, one to each of the said shaft sections, and the master gear 30, which, through pinions not shown, drives the gears 29 with a differential action. The master gear 30 meshes with a spur pinion 31 carried by the shaft 18. The gear connections described are ample for imparting forward movement to the tractor, but of course, suitable reverse driving mechanism is also provided. However, as the transmission mechanism, per se, constitutes no part of the present invention, the details of the reversing mechanism will not be here considered.

The driver's seat 32 is located just at the rear of the engine 16 and is suitably supported from the frame casting 1. Just below this seat 32, the frame casting 1 has a rigid rearwardly projecting draw bar 33 preferably terminating in a flat flanged head 34 to which is bolted or otherwise rigidly secured, a clevis 35, to which a gang plow or the pull or draw connection of any vehicle may be conveniently attached.

The numeral 36 indicates a radiator shown as supported from the forwardly projecting arm of the tractor frame. This radiator may be of any suitable or approved construction and will be connected to the water jacket of the engine through pipes, not shown, and not necessary for the purposes of this case to consider.

Figure 3:
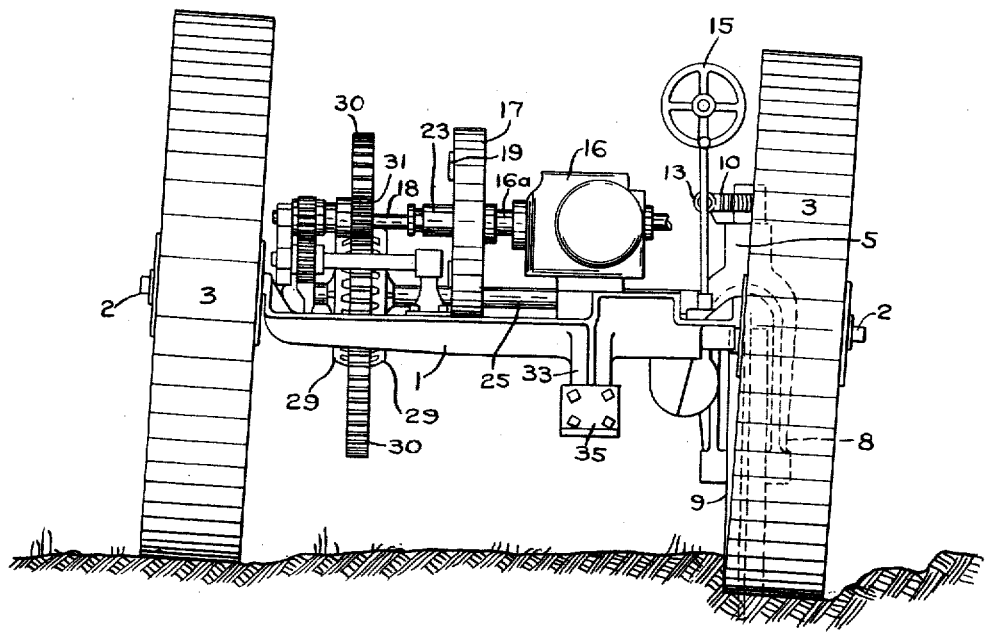
Fig. 3 is a rear elevation of the tractor.

As one of the features contributing to the simplification of the tractor and in the lowest cost thereof, means for raising and lowering one of the traction or rear wheels in respect to the other has been eliminated. The well known purpose of such raising and lowering devices is to keep the tractor approximately level, both when running on the road or surface of the ground and when one of the traction wheels is running in the furrow. A furrow made by a plow will vary approximately from four to six inches. Obviously, when one traction wheel is running on the surface of the ground and the other in a six inch furrow, for example, the tractor will be tilted considerably. Approximately such tilted position is illustrated in Fig. 3. When the frame of the tractor and the transmission mechanism thereon, including the cross shafts, are tilted to too great an extent, the oil on the journals will tend to drift toward the low side of the tractor, and also the carbureter of the engine will be given a maximum of tilt, which tilt of the carbureter, however, does not materially interfere with its action unless such tilt be extreme.

As a feature of the present invention I give the tractor frame a normal tilt or inclination in respect to the axis of the rear traction wheels, which is approximately one-half of the angle of variation between the horizontal position of the wheel axles when running on level ground, and when one of the traction wheels is running in a furrow. To illustrate, if it is assumed that the axes of the rear traction wheels will be horizontal on the level and that there will be a drop of six inches at one side of the tractor when one of the traction wheels runs in a furrow, then the frame of the tractor and the cross shafts thereon, including the engine crank shaft, are given a normal drop of about three inches toward the opposite side, or in other words, toward the land side of the tractor. By this arrangement, when the engine is running on level ground, there will be a drop of but three inches toward the land side of the tractor when running on level ground and a drop of but three inches toward the furrow side of the tractor when one of the traction wheels is running in the furrow, and such drop of three inches will not materially interfere with the oiling or action of the carbureter.

Obviously, the tractor may be easily steered when running on the road or over a field, by the proper manipulation of the front guide wheel 9 through the manipulation of the rod 12 and its connections. When the tractor is used for plowing and the land or inside traction wheel or guide wheel run in the furrow made by the last plow on a previous trip, the said guide wheel may be set so that it will hug the side of the furrow and will then automatically guide the tractor.

With this improved tractor, the outside or land side traction wheel, being positively driven, does not lag back or produce a back drag on the land side of the tractor, and hence, does not interfere with the guiding action of the front guide wheel, either when running on the road or when used for plowing.

It should also be noted that with the rearwardly projected draw bar 33 integral with or rigidly secured to the tractor frame, and with its end terminating, as shown, below the horizontal plane of the axes of the traction wheels, draft strains will produce a downward pressing force on the front guide wheel which will assist in holding the same down upon the ground. This arrangement permits a very light weight being normally thrown upon the said guide wheel. It should further be noted that the said draw bar is located on a line that extends much nearer to the furrow side traction wheel and front guide wheel than it does to the land side traction wheel. This location of the said draw bar prevents too great side thrust in the guide wheel but throws the strain where it will exert some lateral pressure on the guide wheel tending to hold the same against the vertical wall of the furrow, so that it will guide the machine automatically without requiring the said guide wheel to be set at too great an angle in respect to the wall of the furrow.

As is evident, the nut-equipped U-bolts 6 not only connect the bearing bracket or head 5 to the tubular arm 4 with freedom for axial adjustments thereon, but also for rotary adjustments on the axis of said arm. This latter adjustment permits the guide wheel to be set either in a vertical position, or at any inclination or angle, in respect to a vertical position, and by such adjustments the lower edge of the said guide wheel may be movable laterally and thereby set to cause the alined rear traction wheel 3 to run closer to or farther from the wall of the last furrow formed by a plow on a previous trip.

I make no claim in this application to the combination of elements including the differential gearing between the traction wheels, as I have claimed the same in my former application above specified, of which this is a division.

I claim as my invention:

1. In a three wheeled tractor, a truck frame comprising a body casting provided at one side with a forwardly projecting, separately formed but rigidly secured tubular arm, and a separately formed bearing bracket secured to the front end of said arm, in combination with axially alined laterally spaced rear traction wheels supporting the rear body portion of said frame, a guide wheel bracket pivoted to said bearing bracket, a guide wheel journaled to said wheel bracket and alined with one of said traction wheels, a motor carried on the body of said frame, and transmission mechanism connecting said motor to said traction wheels.

2. In a three wheeled tractor, a truck frame comprising a body casting provided at one side with a forwardly projecting arm and a bearing bracket secured to the front end of said arm, said bearing bracket being adjustable longitudinally of said arm, in combination with axially alined laterally spaced rear traction wheels supporting the rear body portion of said frame, a guide wheel bracket pivoted to said bearing bracket, a guide wheel journaled to said wheel bracket and alined with one of said traction wheels, a motor carried on the body of said frame, and transmission mechanism connecting said motor to said traction wheels.

3. In a three wheeled tractor, a truck frame comprising a body casting provided at one side with a forwardly projecting arm and a bearing bracket secured to the front end of said arm, in combination with axially alined laterally spaced rear traction wheels supporting the rear body portion of said frame, a guide wheel bracket pivoted to said bearing bracket, a guide wheel journaled to said wheel bracket and alined with one of said traction wheels, a motor carried on the body of said frame, transmission mechanism connecting said motor to said traction wheels, and a radiator for said motor supported from the intermediate portion of said arm and projected inward from one side thereof.

4. In a three wheeled tractor, a truck frame having a forwardly projecting arm in combination with laterally spaced rear traction wheels carrying the rear portion of said frame, a bearing head secured to the front end of said arm with freedom for rotary adjustment on the axis thereof, a wheel bracket pivoted to said bearing bracket, and a guide wheel journaled to said wheel bracket, said guide wheel being capable of horizontal oscillatory movements and adapted to be set at different angles in respect to a vertical, the latter adjustment being accomplished by the above noted rotary adjustments of said bearing bracket.

5. In a three wheeled tractor, the combination with a truck frame having a forwardly projecting arm, of laterally spaced rear traction wheels carrying the rear portion of said frame, a relatively small front guide wheel, means connecting said guide wheel to said arm with freedom for horizontal oscillatory steering movements and for transverse angular adjustments to set the same in different positions in respect to a vertical, and connections for imparting horizontal oscillatory movements to said guide wheel, and which connections are operative in all of the angular adjustments of said guide wheel.

In witness whereof, I have hereunto set my hand this 6th day of May 1917.

RALPH B. HARTSOUGH.

Witnesses:
CLARENCE P. TOOLEY,
E. F. ROLF.